A. L. P. PERRY.
HOSE CLAMP.
APPLICATION FILED JULY 11, 1911.
1,036,324.
Patented Aug. 20, 1912.
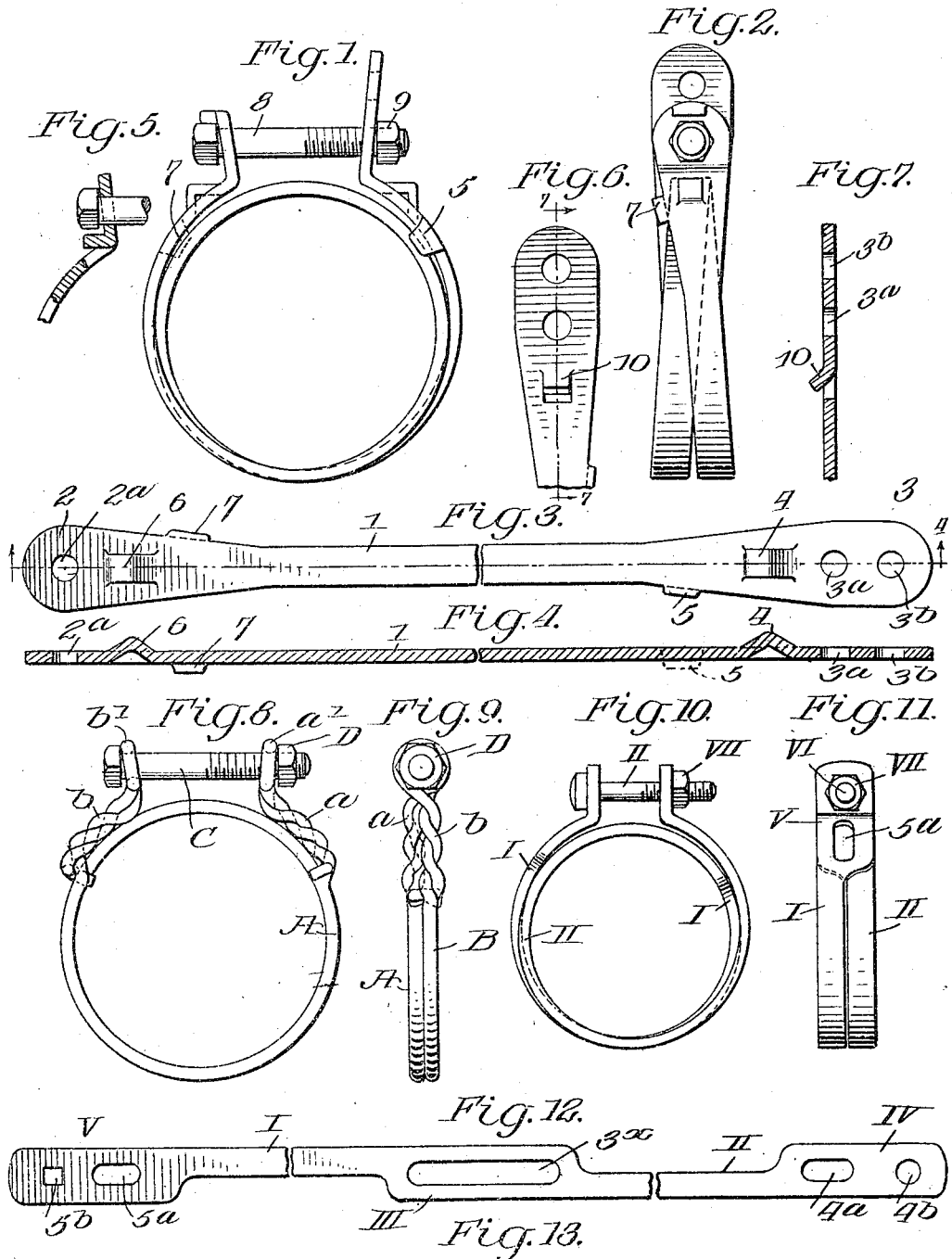
WITNESSES
INVENTOR
ABEL L. P. PERRY.
BY Munn & Co.
ATTORNEYS

UNITED STATES PATENT OFFICE.

ABEL LAUDON PARKER PERRY, OF ROANOKE, VIRGINIA.

HOSE-CLAMP.

1,036,324.

Specification of Letters Patent.   Patented Aug. 20, 1912.

Application filed July 11, 1911.   Serial No. 637,928.

*To all whom it may concern:*

Be it known that I, ABEL L. P. PERRY, a citizen of the United States, and a resident of Roanoke, in the county of Roanoke and State of Virginia, have made certain new and useful Improvements in Hose-Clamps, of which the following is a specification.

My invention relates to improvements in hose clamps, and it consists in the combinations, constructions, and arrangements herein described and claimed.

An object of my invention is to provide a clamp which has a practically uniform bearing surface around the entire hose.
A further object of my invention is to provide a device which is devoid of any cutting edges such as tongues, or the like which are apt to injure the hose and to cause it to wear out sooner than it otherwise would.
Other objects and advantages will appear in the following specification, and the novel features of the device will be particularly pointed out in the appended claim.

My invention is illustrated in the accompanying drawings forming part of this application in which similar reference characters indicate like parts in the several views and in which—

Figure 1 is a face view of a clamp constructed according to my invention, Fig. 2 is an edge view thereof, Fig. 3 is a development of the main body portion, Fig. 4 is a section through the device on the line 4—4 of Fig. 3, Fig. 5 is a detail view showing a modified form of the end of the clamping member, Fig. 6 is a side view of the end of the clamping member shown in Fig. 5, Fig. 7 is a section along the line 7—7 of Fig. 6, Fig. 8 is a face view of a modified form of the device, Fig. 9 is an edge view of the device shown in Fig. 8, Fig. 10 is a face view of another modification, Fig. 11 is an edge view of the form shown in Fig. 10, Fig. 12 is a development of the main body portions shown in Figs. 10 and 11, and Fig. 13 is a modified form of arrangement for the ends of the body portion.

Referring now particularly to Fig. 3, I have shown therein the development of the main body portion. This is made preferably of spring metal such as spring brass or spring steel, and consists of a central portion 1 having enlarged ends 2 and 3 respectively. The end 3 is provided with perforations $3^a$ and $3^b$, with a V-shaped stamped portion 4, and with a side flange 5. The end 2 is provided with a perforation $2^a$, a V-shaped stamped portion 6 and with a side flange 7. In making the clamp the body portion is coiled in two convolutions in the manner shown in Figs. 1 and 2. The bolt 8 is passed through one of the perforations $3^a$ or $3^b$ and through the perforation $2^a$. A nut 9 may be screwed up so as to draw the clamp tighter. The flanges 5 and 7 are bent downwardly, the flange 5 being arranged to engage the inner convolution, and the flange 7 to engage the same convolution on the other side. This holds the central convolution in place. It will be seen that the central convolution is the one which is in contact with the exterior of the hose, the outer ends of the second convolution being away from the hose. This gives a uniform bearing surface on the entire hose, and there are no tongues or other members to grip the hose and to tear it, as in other similar devices. On each clamp it may be necessary to use a tool for holding the ends of the clamp near each other while the bolt 8 is being inserted and the nut 9 screwed on. It will be noted in Fig. 1 that the portions 4 and 6 provide flat surfaces against which the sides of the tool such as the jaws of a vise may be placed so as to force the ends together to permit the insertion of the bolt 8 and the subsequent tightening of the nut 9.

In Figs. 5, 6 and 7, I have shown a modified form for the ends. Thus instead of having V-shaped portions 4 and 6 stamped from the metal, a flange 10 is constructed from the metal as shown in Figs. 6 and 7. The flange 10 serves the same purpose as the V-shaped stamped portions 4 and 6 in the form just described.

In Figs. 8 and 9 the clamp is made of two convolutions of wire. Thus the convolution A is twisted back upon itself at $a$ and a loop formed at $a'$. Similarly the convolution B is twisted back upon itself at $b$, a loop being formed at $b'$. The bolt C is passed through the loops $b'$ and $a'$ and is held in position by means of a nut D.

In Figs. 10, 11 and 12, I have shown another modification. This consists of a metal strip having reduced portions I and II, a central enlarged portion III and end portions IV and V. The central portion is provided with a longitudinal slot $3^x$, while the end portions are provided with the openings $4^a$, $4^b$ and $5^a$, $5^b$, respectively. In constructing the clamp the body portion is wrapped or coiled so that the reduced portions I and II lie side by side for nearly the entire circumference of the device. At the ends however the notched portion V overlaps one end of the central portion III, while the portion IV overlaps the other end of the portion III. The effect of this is to give the bearing surface of the clamp an almost continuous contact with the outside of the hose, here being no tongues or other surfaces to engage the hose so as to cut it. A bolt VI passes through the openings $4^b$ and $5^b$ and a nut VII is provided for drawing the two ends IV and V together.

In Fig. 13, I have shown a modification in which the ends IV and V are provided with off-set portions $4^x$ and $5^x$, respectively. These off set portions $4^x$ and $5^x$ are for the purpose of affording means for holding the ends together preparatory to passing a bolt through the ends, these off set portions serving the purpose of the V-shaped stamped portions 4 and 6 described in connection with Fig. 1. Besides having the advantage of gripping the hose around its entire circumference without any danger of cutting it, the clamp being made of spring metal, will open up or uncoil when the bolt is loosened so that it slides readily off from the hose.

I claim:—

In a hose clamp, a body portion formed of a single piece of coiled metal and comprising a central portion of approximately uniform width and enlarged end portions, the ends of the body portion overlapping the convolution of the central portion and being bent outwardly at an angle from the central portion, said end portions having inwardly bent lugs arranged to engage the convolution of the body portion for holding the latter in place, said ends being provided with opposed lugs for permitting the ends to be forced together, and means for forcing the bent up portions of the ends together.

ABEL LAUDON PARKER PERRY.

Witnesses:
E. W. POINDEXTER,
LOTTIE STEWART.